United States Patent
Chang et al.

(10) Patent No.: US 8,255,184 B2
(45) Date of Patent: Aug. 28, 2012

(54) PROGRAMMING SYSTEM FOR A COORDINATE MEASURING MACHINE AND METHOD THEREOF

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/554,172

(22) Filed: Sep. 4, 2009

(65) Prior Publication Data

US 2010/0268355 A1     Oct. 21, 2010

(30) Foreign Application Priority Data

Apr. 21, 2009   (CN) .......................... 2009 1 0301738

(51) Int. Cl.
   *G01C 9/00*   (2006.01)
   *G01N 37/00*   (2006.01)

(52) U.S. Cl. .......................................... 702/150; 702/83

(58) Field of Classification Search .................... 702/83, 702/150
See application file for complete search history.

(56) References Cited

U.S. PATENT DOCUMENTS

| | | | | |
|---|---|---|---|---|
| 5,465,221 | A * | 11/1995 | Merat et al. ...................... | 702/83 |
| 7,831,391 | B2 * | 11/2010 | Greene et al. ................... | 701/301 |
| 2003/0204524 | A1 * | 10/2003 | Wu et al. ................... | 707/103 R |
| 2004/0051711 | A1 * | 3/2004 | Dimsdale et al. ............. | 345/419 |
| 2004/0254758 | A1 * | 12/2004 | Chang ........................... | 702/155 |
| 2007/0150230 | A1 * | 6/2007 | Chang et al. ................... | 702/168 |
| 2007/0169034 | A1 * | 7/2007 | Chang et al. ................... | 717/140 |

OTHER PUBLICATIONS

English Abstract of TW 201040490, Nov. 16, 2010.*

* cited by examiner

*Primary Examiner* — Michael Nghiem
(74) *Attorney, Agent, or Firm* — Altis Law Group, Inc.

(57) ABSTRACT

A programming method of a coordinate measuring machine (CMM) constructs a polygonal mesh model for a manufactured part according to a point cloud of the manufactured part. Basic measurement elements, relational measurement elements, a part coordinate system, and a collision-free inspection path are obtained according to the polygonal mesh model, so as to generate a measurement program of the CMM.

20 Claims, 5 Drawing Sheets

PROGRAMMING SYSTEM FOR A COORDINATE MEASURING MACHINE AND METHOD THEREOF

BACKGROUND

1. Technical Field

Embodiments of the present disclosure relate to machine programming, and more particularly to a programming system and method of a coordinate measuring machine (CMM).

2. Description of Related Art

Coordinate measuring machines (CMMs) are widely used in industry to measure manufactured parts. Measurements of the manufactured parts determine if the manufactured parts meet design specifications and provide information for improvement in process control. With numerous increments of measuring tasks for different manufactured parts, programming speed of CMMs can become a bottleneck in the measurement process. Online programming is a currently popular programming method. However, online programming is slow, and CMMs must remain idle during programming. An alternative solution is to design measurement programs for manufactured parts according to design drawings thereof. Programming with design drawings is much faster. However, measurement errors may occur, due to disconformities between the drawings and the manufactured parts.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
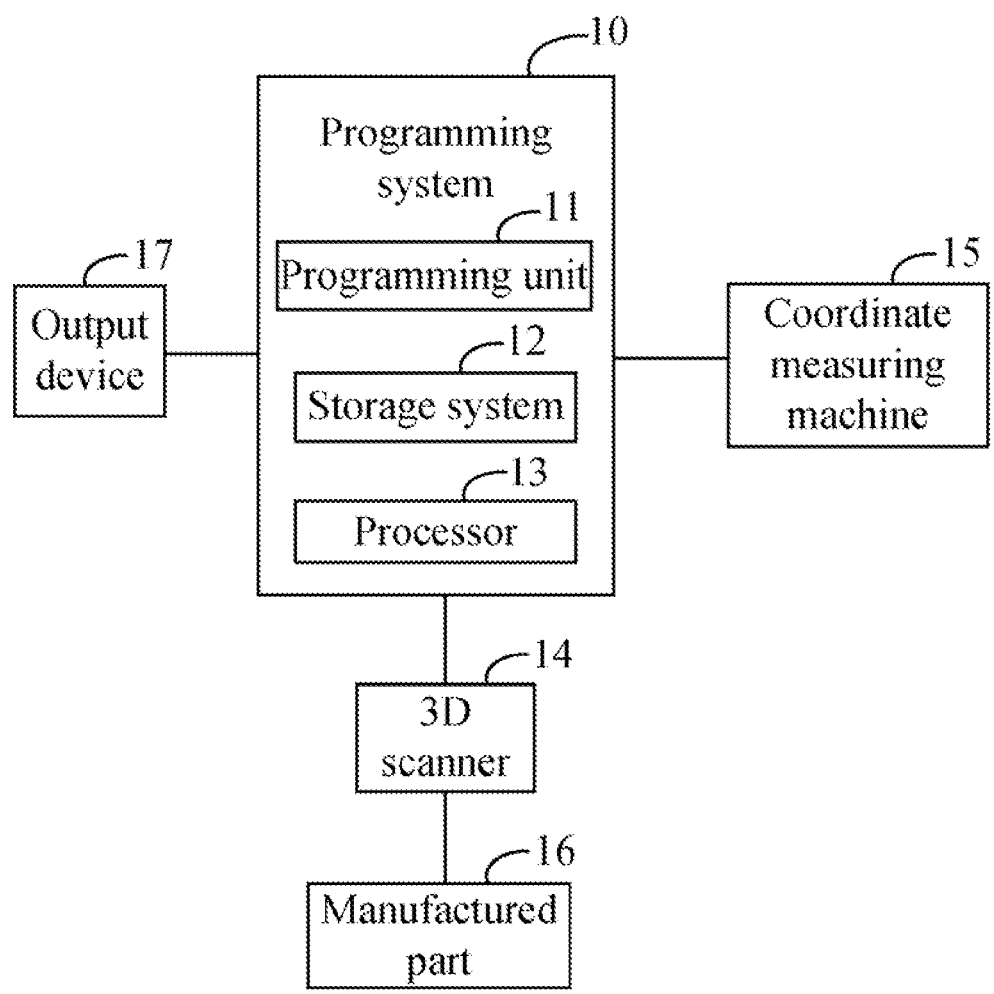
FIG. 1 is a block diagram of one embodiment of a programming system of a coordinate measuring machine (CMM).

FIG. 1 is a block diagram of one embodiment of a programming system 10 of a coordinate measuring machine (CMM) 15. The programming system 10 may generate a measurement program for a manufactured part 16. The measurement program is executable by the CMM 15 to measure other manufactured parts identical to the manufactured part 16. The programming system 10 may be connected to a three-dimensional (3D) scanner 14, such as a charge coupled device (CCD) scanner or a laser scanner, for example. The 3D scanner 14 may obtain a point cloud of the manufactured part 16 by scanning surfaces of the manufactured part 16. The programming system 10 may be further connected to an output device 17, such as a display screen, for example. In one embodiment, the programming system 10 may include a programming unit 11, a storage system 12, and at least one processor 13. One or more computerized codes of the programming unit 11 may be stored in the storage system 12 and executed by the at least one processor 13.

Figure 2:
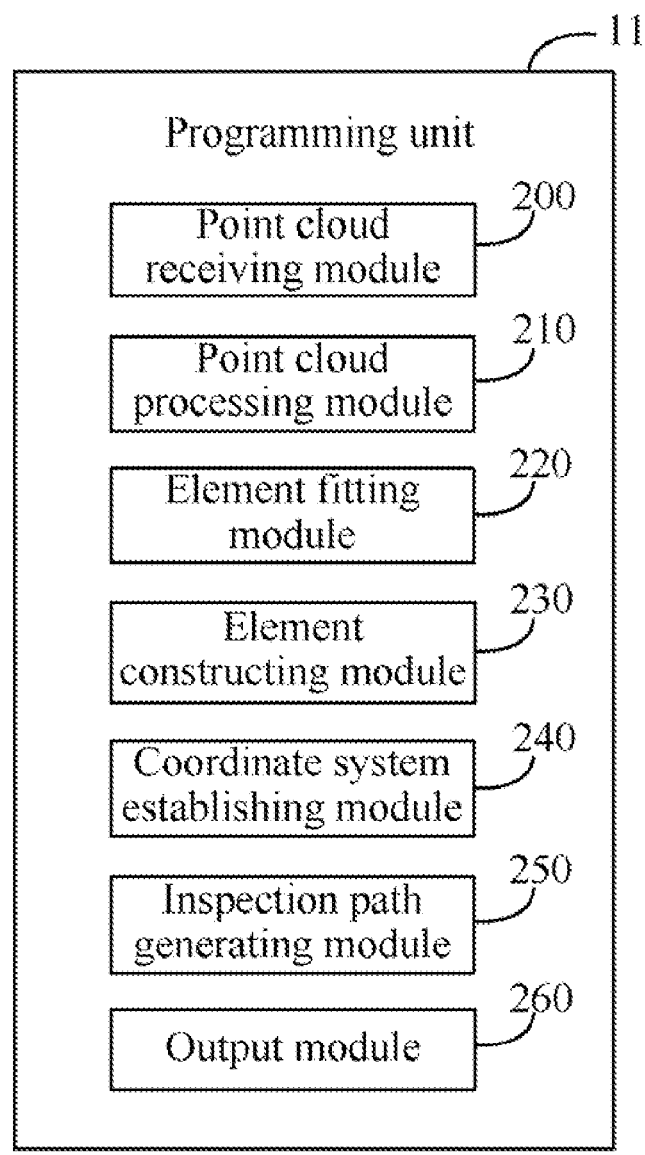
FIG. 2 illustrates a programming unit of the programming system of FIG. 1 comprising function modules.

FIG. 2 illustrates a programming unit of the programming system of FIG. 1 comprising function modules. In one embodiment, the programming unit 11 includes a point cloud receiving module 200, a point cloud processing module 210, an element fitting module 220, an element constructing module 230, a coordinate system establishing module 240, an inspection path generating module 250, and an output module 260.

The point cloud receiving module 200 is operable to receive a point cloud of the manufactured part 16 from the 3D scanner 14. The point cloud may comprise a number of surface points of the manufactured part 16. The manufactured part 16 may be a molded part, such as a mental casting, for example.

The point cloud processing module 210 is operable to filter the point cloud, and construct a polygonal mesh model of the manufactured part 16 according to the filtered point cloud. The point cloud processing module 210 filters the point cloud to simplify the point cloud. As such, further process of the point cloud may be more rapid and accurate. The polygonal mesh model of the manufactured part 16 may be a triangular mesh model, or any other suitable mesh model, depending on the embodiment. In the polygonal mesh model, each surface of the manufactured part 16 is made up of a number of contiguous polygons.

The element fitting module 220 is operable to fit a series of basic measurement elements according to the polygonal mesh model of the manufactured part 16. It may be understood that a basic measurement element can be directly measured by the CMM 15. The basic measurement elements may include various geometric features, such as lines, planes, circles, spheres, cylinders, and cones.

In one embodiment, the element fitting module 220 may be further operable to obtain feature values of the basic measurement elements of the manufactured part 16. A basic measurement element can be characterized by one or more corresponding feature values. For example, if the basic measurement element is a line, the feature values may include coordinates of a start point and an end point of the line. If the basic measurement element is a plane, the feature values may include coordinates of a center point and a normal vector of the plane. If the basic measurement element is a circle, the feature values may include coordinates of a center point, a radius, and a normal vector of the circle.

The element constructing module 230 is operable to construct a series of relational measurement elements from the basic measurement elements. A relational measurement element cannot be measured directly by the CMM 15. The relational measurement elements depict various geometric relationships of the basic measurement elements, such as distance, symmetry, intersection, angle, and projection. Similar to the basic measurement elements, the relational measurement elements may include various geometric features, such as lines, planes, circles, spheres, cylinders, and cones, for example.

In one embodiment, the element constructing module 230 may be further operable to obtain feature values of the relational measurement elements of the manufactured part 1 6. Similar to the basic measurement elements, a relational measurement element can be characterized by the feature values of the relational measurement element.

The coordinate system establishing module 240 is operable to establish a part coordinate system based upon the polygonal mesh model of the manufactured part 16. The part coordinate system may be mathematically related to a machine coordinate system of the CMM 15. The machine coordinate system may be predetermined and unchangeable. Coordinate axes of the machine coordinate system refer to mechanical motions of the CMM 15. The part coordinate system may be changeable for different manufactured parts. Coordinate axes of the part coordinate system refer to geometric features of manufactured parts.

The inspection path generating module 250 is operable to generate an inspection path of the basic measurement elements, and detect collisions between the CMM 15 and the manufactured part 16 on the inspection path. If any collision is detected, the inspection path generating module 250 may modify the inspection path so as to obtain a collision-free inspection path of the manufactured part 16.

The output module 260 is operable to integrate the basic measurement elements, the relational measurement elements, the part coordinate system, and the collision-free inspection path to generate a measurement program of the manufactured part 16. The measurement program is output to the CMM 15. In one embodiment, the output module 260 is further operable to output the feature values of the basic measurement elements and the feature values of the relational measurement elements to the output device 17.

Figure 3:
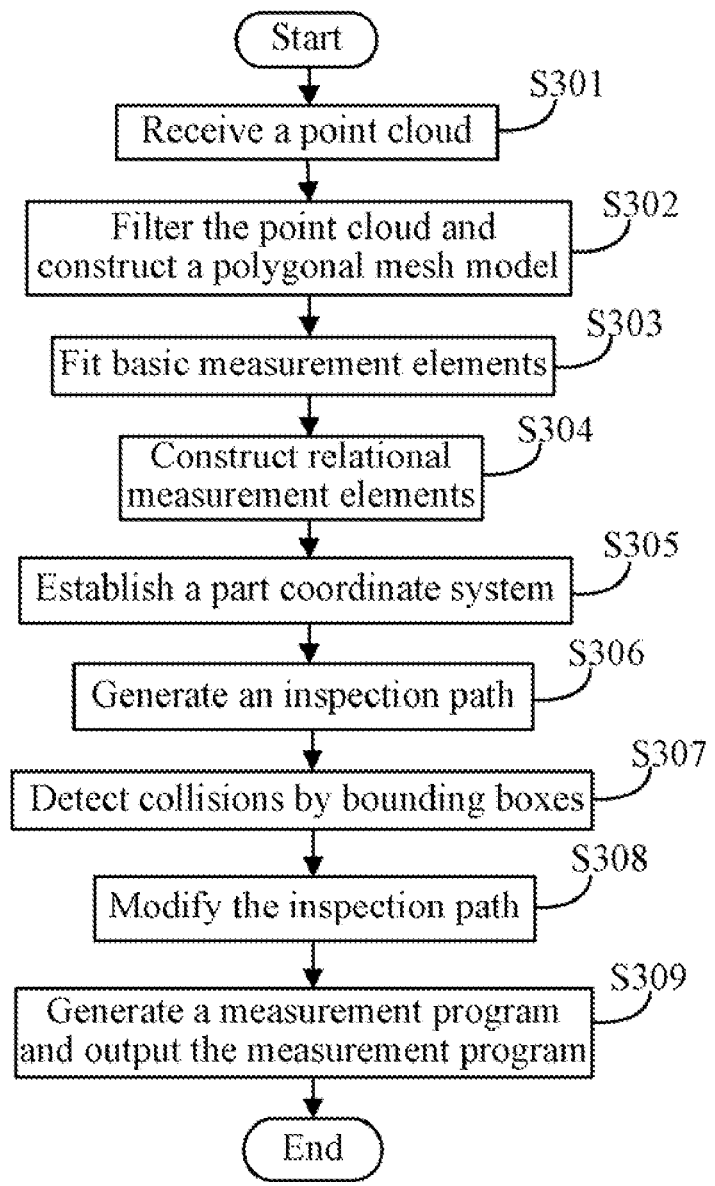
FIG. 3 is a flowchart of one embodiment of a programming method of a CMM.

FIG. 3 is a flowchart of one embodiment of a programming method of a coordinate measuring machine (CMM) 15. Depending on the embodiments, additional blocks may be added, others removed, and the ordering of the blocks may be changed.

In block S301, the point cloud receiving module 200 receives a point cloud of the manufactured part 16 from the three-dimensional scanner 14. As mentioned, the 3D scanner 14 may obtain a point cloud of the manufactured part 16, the point cloud comprising a number of surface points of the manufactured part 16.

Figure 4:
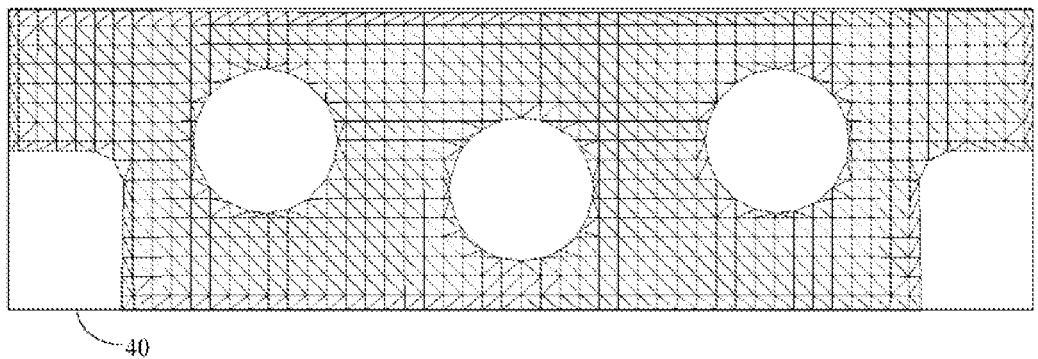
FIG. 4 illustrates one embodiment of a triangular mesh model of a manufactured part.

In block S302, the point cloud processing module 210 filters the point cloud, and constructs a polygonal mesh model of the manufactured part 16 accordingly. In one embodiment, the point cloud processing module 210 may filter the point cloud by deleting noise points and redundant points from the point cloud. A meshing method, such as an iterative algorithm or the Delaunay algorithm, may be used to construct the polygonal mesh model. In one embodiment, the point cloud processing module 210 constructs a triangular mesh model for the manufactured part 16. FIG. 4 illustrates one embodiment of a triangular mesh model of a manufactured part, where each surface of the manufactured part comprises a number of contiguous triangles.

In block S303, the element fitting module 220 fits a series of basic measurement elements according to the polygonal mesh model of the manufactured part 16. As mentioned, the basic measurement elements may include various geometric features. In one embodiment, the element fitting module 220 may use a method of least squares, in conjunction with the quasi-Newton iterative algorithm, to fit the basic measurement elements. Depending on the embodiment, the element fitting module 220 may obtain feature values of the basic measurement elements of the manufactured part 16.

Figure 5:
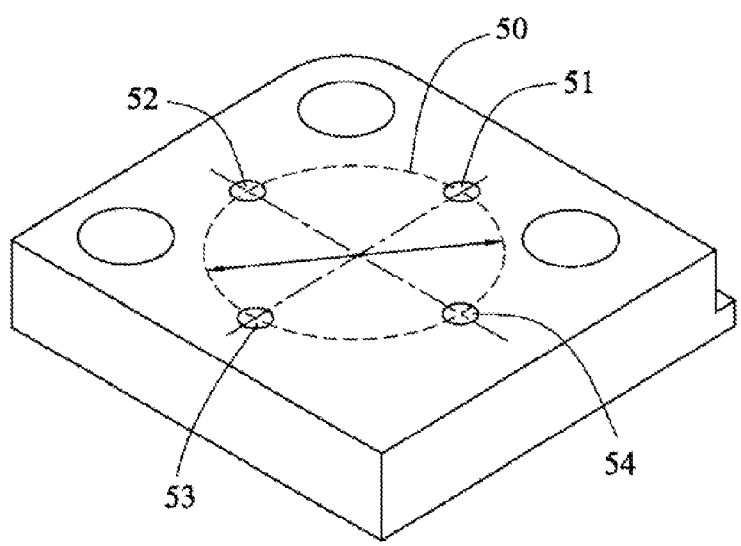
FIG. 5 illustrates one embodiment of a relational measurement element of a manufactured part.

In block S304, the element constructing module 230 constructs a series of relational measurement elements from the basic measurement elements. As mentioned, the relational measurement elements depict various geometric relationships of the basic measurement elements. In one example with respect to FIG. 5, circles 51-54 are basic measurement elements. A centerline circle 50 is a relational measurement element, which is constructed from the circles 51-54.

In block S305, the coordinate system establishing module 240 establishes a part coordinate system based upon the polygonal mesh model of the manufactured part 16. In one embodiment, the coordinate system establishing module 240 may fit a plane as a reference plane (e.g., the X-Y plane) according to the polygonal mesh model of the manufactured part 16. Accordingly, a first coordinate axis (e.g., the Z axis) is determined. The coordinate system establishing module 240 may determine a second coordinate axis (e.g., the X axis) of the part coordinate system in the reference plane. A third coordinate axis (e.g., the Y axis) is determined according to the first coordinate axis and the second coordinate axis based upon the right-handed rule. The coordinate system establishing module 240 may further determine a point as the coordinate origin of the part coordinate system. As such, the part coordinate system is established.

In block S306, the inspection path generating module 250 generates an inspection path of the basic measurement elements. The inspection path generating module 250 may determine measuring points for each of the basic measurement elements and integrate all the measuring points to generate the inspection path. If the basic measurement element is a line, the measuring points may include a start point and an end point. The inspection path may be planned based upon various measuring parameters, such as a proximity distance, a safety surface, and a retreat distance. The proximity distance is defined as a safe distance that the probe of the CMM 15 needs to slow down when the probe approaches a measuring point of a manufactured part. The retreat distance is defined as a specific distance that the probe of the CMM 15 needs to move away from a measuring point of the manufactured part after contacting the measuring point. The safety surface is defined as a virtual surface on which the probe of the CMM 15 moves without colliding with the manufactured part from one measuring point to another measuring point.

In block S307, the coordinate system establishing module 240 detects collisions between the CMM 15 and the manufactured part 16 on the inspection path. The inspection path generating module 250 may simulate the inspection path in a computer aided design (CAD) environment. The polygonal mesh model of the manufactured part 16 and a polygonal mesh model of the CMM 15 may be imported to the CAD environment. In one embodiment, the inspection path generating module 250 detects the collisions by means of bounding boxes (see bounding box, FIG. 4). If there is a collision, the inspection path generating module 250 may mark the collision on the polygonal mesh model of the manufactured part 16.

In block S308, the coordinate system establishing module 240 modifies the inspection path according to the collision detection. The detecting process (block S307) and the modifying process (block S308) may continue until a collision-free inspection path of the manufactured part 16 is obtained.

In block S309, the output module 260 integrates the basic measurement elements, the relational measurement elements, the part coordinate system, and the collision-free inspection path to generate a measurement program of the manufactured part 16. The output module 260 outputs the measurement program to the CMM 15. The CMM 15 is able to measure other manufactured parts identical to the manufactured part 16 by executing the measurement program. In one embodiment, the output module 260 may further output the feature values of the basic measurement elements and the feature values of the relational measurement elements to the output device 17.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A programming system of a coordinate measuring machine, the programming system comprising:
   a storage system;
   at least one processor; and
   a programming unit stored in the storage system and executable by the at least one processor, the programming unit comprising:
      a point cloud receiving module operable to receive a point cloud of a manufactured part from a three-dimensional scanner;
      a point cloud processing module operable to filter the point cloud and construct a polygonal mesh model of the manufactured part according to the filtered point cloud;
      an element fitting module operable to fit a series of basic measurement elements according to the polygonal mesh model of the manufactured part, wherein the basic measurement elements are directly measurable by the coordinate measuring machine;
      an element constructing module operable to construct a series of relational measurement elements depicting various geometric relationships of the basic measurement elements, wherein the relational measurement elements are not directly measurable by the coordinate measuring machine;
      a coordinate system establishing module operable to establish a part coordinate system based upon the polygonal mesh model of the manufactured part by fitting a plane as a reference plane of the part coordinate system of the manufactured part according to the polygonal mesh model of the manufactured part, determining a first coordinate axis of the part coordinate system according to the reference plane, determining a second coordinate axis of the part coordinate system in the reference plane, determining a third coordinate axis of the part coordinate system according to the first coordinate axis and the second coordinate axis based upon right-handed rule, and determining a point as the coordinate origin of the part coordinate system;
      an inspection path generating module operable to generate an inspection path of the basic measurement elements, detect collisions between the coordinate measuring machine and the manufactured part on the inspection path, and modify the inspection path according to the collision detection, so as to obtain a collision-free inspection path of the manufactured part; and
      an output module operable to integrate the basic measurement elements, the relational measurement elements, the part coordinate system, and the collision-free inspection path to generate a measurement program of the manufactured part, and output the measurement program to the coordinate measuring machine, wherein the measurement program is executable by the coordinate measuring machine to measure other manufactured parts identical to the manufactured part.

2. The system of claim 1, wherein the point cloud processing module filters the point cloud by deleting noise points and redundant points from the point cloud.

3. The system of claim 1, wherein the element fitting module fits the basic measurement elements using a method of least squares.

4. The system of claim 1, wherein the inspection path generating module detects the collisions by bounding boxes.

5. The system of claim 1, wherein the element fitting module is further operable to obtain feature values of the basic measurement elements of the manufactured part.

6. The system of claim 5, wherein the element constructing module is further operable to obtain feature values of the relational measurement elements of the manufactured part.

7. The system of claim 6, wherein the output module is further operable to output the feature values of the basic measurement elements and the feature values of the relational measurement elements to an output device.

8. The system of claim 1, wherein the polygonal mesh model is a triangular mesh model.

9. A computer-based method of a coordinate measuring machine being executed by a processor of a computing system, the method comprising:
   receiving a point cloud of a manufactured part from a three-dimensional scanner;
   filtering the point cloud and constructing a polygonal mesh model of the manufactured part according to the filtered point cloud;
   fitting a series of basic measurement elements according to the polygonal mesh model of the manufactured part, wherein the basic measurement elements are directly measurable by the coordinate measuring machine;
   constructing a series of relational measurement elements defining various geometric relationships of the basic measurement elements, wherein the relational measurement elements are not directly measurable by the coordinate measuring machine;
   establishing a part coordinate system based upon the polygonal mesh model of the manufactured part, the establishing step comprising steps of fitting a plane as a reference plane of the part coordinate system of the manufactured part according to the polygonal mesh model of the manufactured part, determining a first coordinate axis of the part coordinate system according to the reference plane, determining a second coordinate axis of the part coordinate system in the reference plane, determining a third coordinate axis of the part coordinate system according to the first coordinate axis and the second coordinate axis based upon right-handed rule, and determining a point as the coordinate origin of the part coordinate system;
   generating an inspection path of the basic measurement elements, detecting collisions between the coordinate measuring machine and the manufactured part on the inspection path, and modifying the inspection path according to the collision detection, so as to obtain a collision-free inspection path of the manufactured part; and
   integrating, using the processor, the basic measurement elements, the relational measurement elements, the part coordinate system, and the collision-free inspection path to generate a measurement program of the manufactured part, and outputting the measurement program to the coordinate measuring machine, wherein the measurement program is executable by the coordinate measuring machine to measure other manufactured parts identical to the manufactured part.

10. The method of claim 9, wherein the point cloud is filtered by deleting noise points and redundant points from the point cloud.

11. The method of claim 9, wherein the basic measurement elements are fitted using a method of least squares.

12. The method of claim 9, wherein the collisions between the coordinate measuring machine and the manufactured part on the inspection path are detected by bounding boxes.

13. The method of claim 9, further comprising:
  obtaining feature values of the basic measurement elements of the manufactured part after fitting the basic measurement elements;
  obtaining feature values of the relational measurement elements of the manufactured part after constructing the relational measurement elements; and
  outputting the feature values of the basic measurement elements and the feature values of the relational measurement elements to an output device.

14. The method of claim 9, wherein the polygonal mesh model is a triangular mesh model.

15. A non-transitory computer-readable medium having stored thereon instructions that, when executed by a computerized device, cause the computerized device to execute a computer-implemented programming method of a coordinate measuring machine, the method comprising:
  receiving a point cloud of a manufactured part from a three-dimensional scanner;
  filtering the point cloud and constructing a polygonal mesh model of the manufactured part according to the filtered point cloud;
  fitting a series of basic measurement elements according to the polygonal mesh model of the manufactured part, wherein the basic measurement elements are directly measurable by the coordinate measuring machine;
  constructing a series of relational measurement elements defining various geometric relationships of the basic measurement elements, wherein the relational measurement elements are not directly measurable by the coordinate measuring machine;
  establishing a part coordinate system based upon the polygonal mesh model of the manufactured part, the establishing step comprising steps of fitting a plane as a reference plane of the part coordinate system of the manufactured part according to the polygonal mesh model of the manufactured part, determining a first coordinate axis of the part coordinate system according to the reference plane, determining a second coordinate axis of the part coordinate system in the reference plane, determining a third coordinate axis of the part coordinate system according to the first coordinate axis and the second coordinate axis based upon right-handed rule, and determining a point as the coordinate origin of the part coordinate system;
  generating an inspection path of the basic measurement elements, detecting collisions between the coordinate measuring machine and the manufactured part on the inspection path, and modifying the inspection path according to the collision detection, so as to obtain a collision-free inspection path of the manufactured part; and
  integrating the basic measurement elements, the relational measurement elements, the part coordinate system, and the collision-free inspection path to generate a measurement program of the manufactured part, and outputting the measurement program to the coordinate measuring machine, wherein the measurement program is executable by the coordinate measuring machine to measure other manufactured parts identical to the manufactured part.

16. The medium of claim 15, wherein the point cloud is filtered by deleting noise points and redundant points from the point cloud.

17. The medium of claim 15, wherein the basic measurement elements are fitted using a method of least squares.

18. The medium of claim 15, wherein the collisions between the coordinate measuring machine and the manufactured part on the inspection path are detected by bounding boxes.

19. The medium of claim 15, wherein the method further comprises:
  obtaining feature values of the basic measurement elements of the manufactured part after fitting the basic measurement elements;
  obtaining feature values of the relational measurement elements of the manufactured part after constructing the relational measurement elements; and
  outputting the feature values of the basic measurement elements and the feature values of the relational measurement elements to an output device.

20. The medium of claim 15, wherein the polygonal mesh model is a triangular mesh model.

* * * * *